Figure 1:
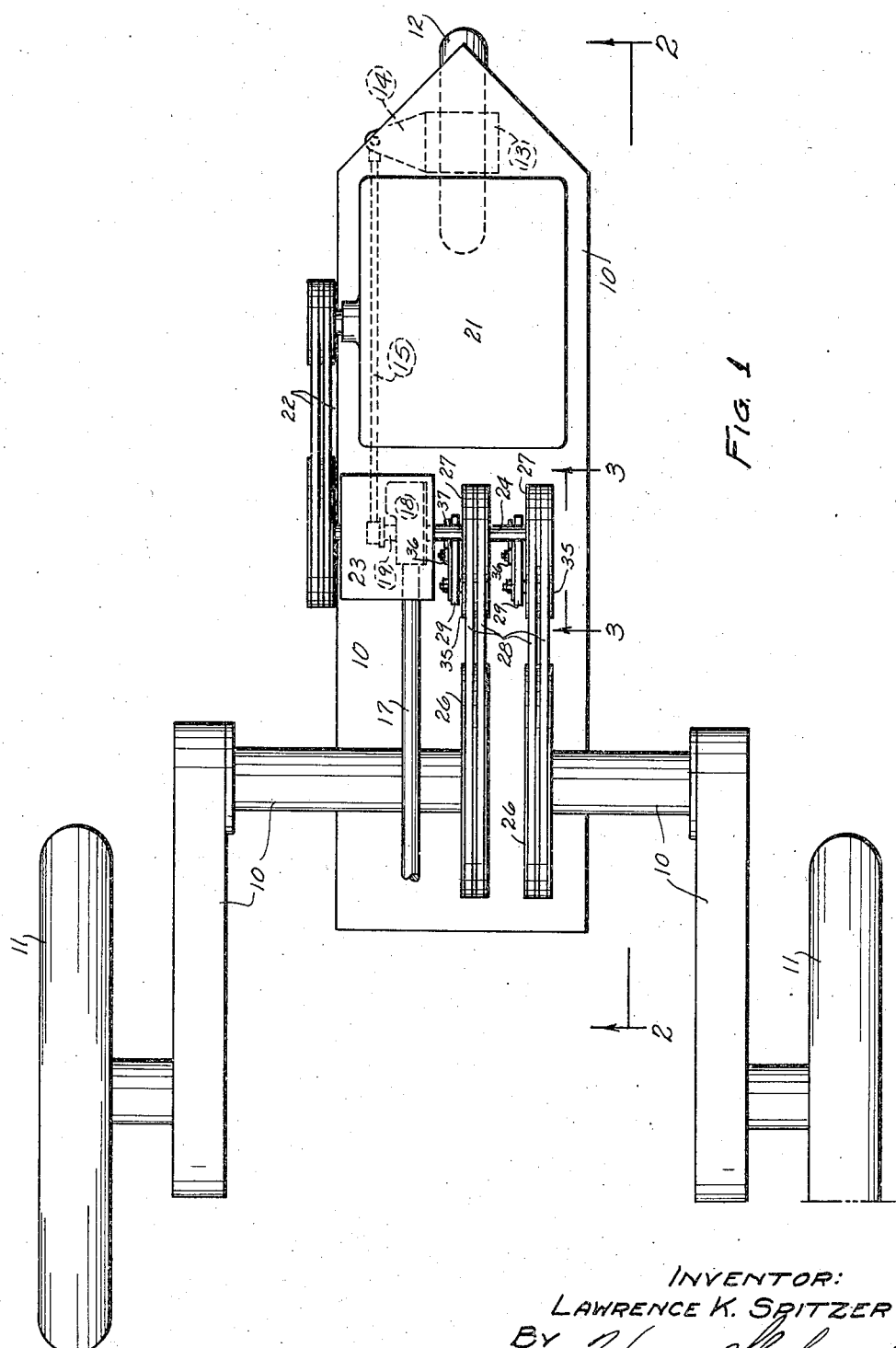

Oct. 4, 1949. L. K. SPITZER 2,483,599
DRIVE-CORRELATING STEERING MEANS FOR TRACTORS
Filed Oct. 24, 1947 3 Sheets-Sheet 2

INVENTOR:
LAWRENCE K. SPITZER
BY
ATTORNEY

Oct. 4, 1949.  L. K. SPITZER  2,483,599
DRIVE-CORRELATING STEERING MEANS FOR TRACTORS
Filed Oct. 24, 1947  3 Sheets-Sheet 3
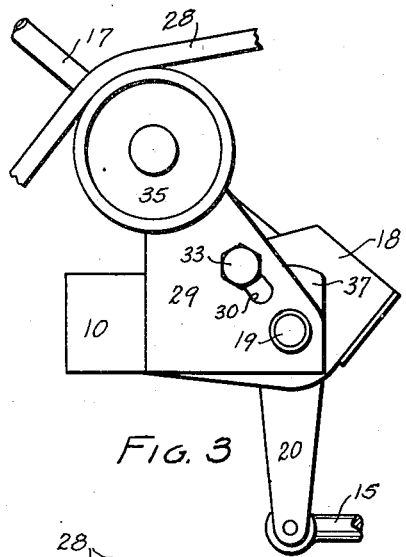
FIG. 3
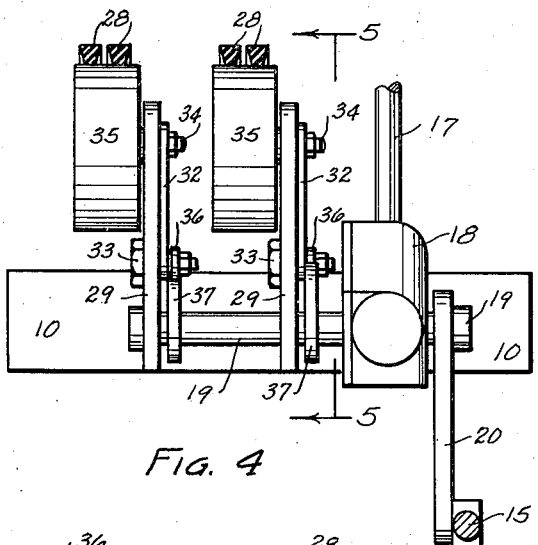
FIG. 4
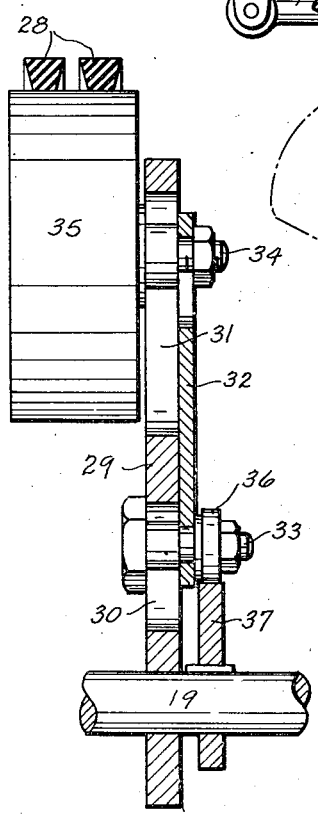
FIG. 6
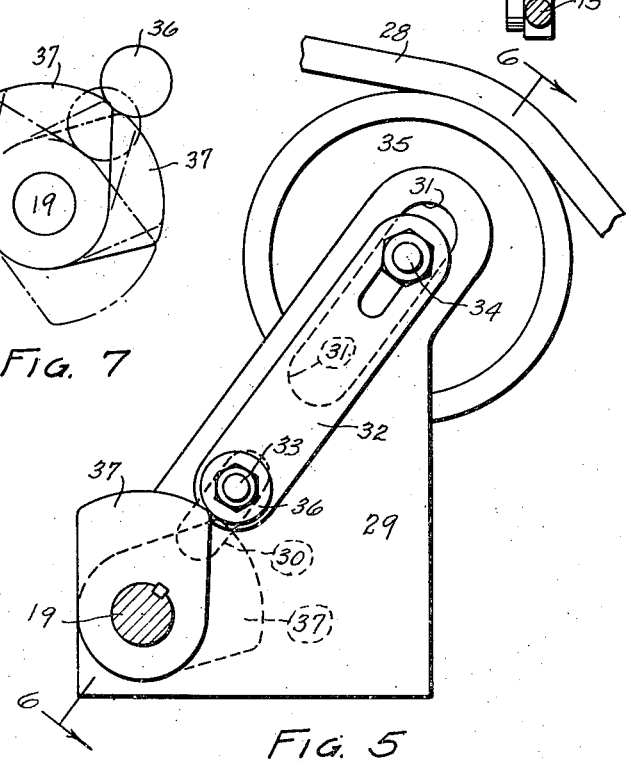
FIG. 7
FIG. 5
INVENTOR:
LAWRENCE K. SPITZER
BY Homer G. Sweet
ATTORNEY Patented Oct. 4, 1949

2,483,599

UNITED STATES PATENT OFFICE 2,483,599

DRIVE-CORRELATING STEERING MEANS FOR TRACTORS

Lawrence K. Spitzer, Arapahoe County, near Englewood, Colo., assignor to Arrow Manufacturing Company, a corporation of Colorado Application October 24, 1947, Serial No. 781,925

4 Claims. (Cl. 180—18)

This invention relates to front-wheel-steerable, self-propelled vehicles, and more particularly to such vehicles arranged for the selectively-independent application of power to the two rear drive wheels, and has as an object to provide novel and improved means for automatically correlating the steering of the vehicle with the power coupling to the vehicle drive wheels in a manner to enhance and facilitate the operative dirigibility of the unit.

A further object of the invention is to provide improved steering-responsive means in a self-propelled vehicle whereby the maneuverability of the unit is enhanced without the use of conventional differential-type gearing.

A further object of the invention is to provide improved steering-responsive means in a self-propelled vehicle automatically operable to interrupt the power coupling to one of the vehicle rear drive wheels as an incident of unit steered deviation from straight-line travel.

A further object of the invention is to provide improved steering-responsive means in a self-propelled vehicle automatically operable to interrupt the power coupling to the vehicle rear drive wheel on the inner or inward side of a turn as an incident of unit steered deviation from straight-line travel.

A further object of the invention is to provide an improved construction and arrangement of elements automatically and effectively responsive to the steering of a dirigible, self-propelled vehicle to interrupt the power coupling to the vehicle rear drive wheel on the inner or inward side of a turn while maintaining the power coupling to the drive wheel on the outer or outward side of the turn.

A further object of the invention is to provide an improved automatically-selective, steering-responsive, clutch in controlling relation with independent power couplings to the rear drive wheels of a dirigible, self-propelled vehicle that is simple, inexpensive, and compact of construction, positive in operation, efficient to attainment of the ends for which designed, and productive in use of operating ease and advantage characterizing the vehicle to which applied.

With the foregoing and other objects in view, my invention consists in the construction, arrangement, and combination of elements hereinafter set forth, pointed out in my claims, and illustrated by the accompanying drawings, in which—

Figure 2:
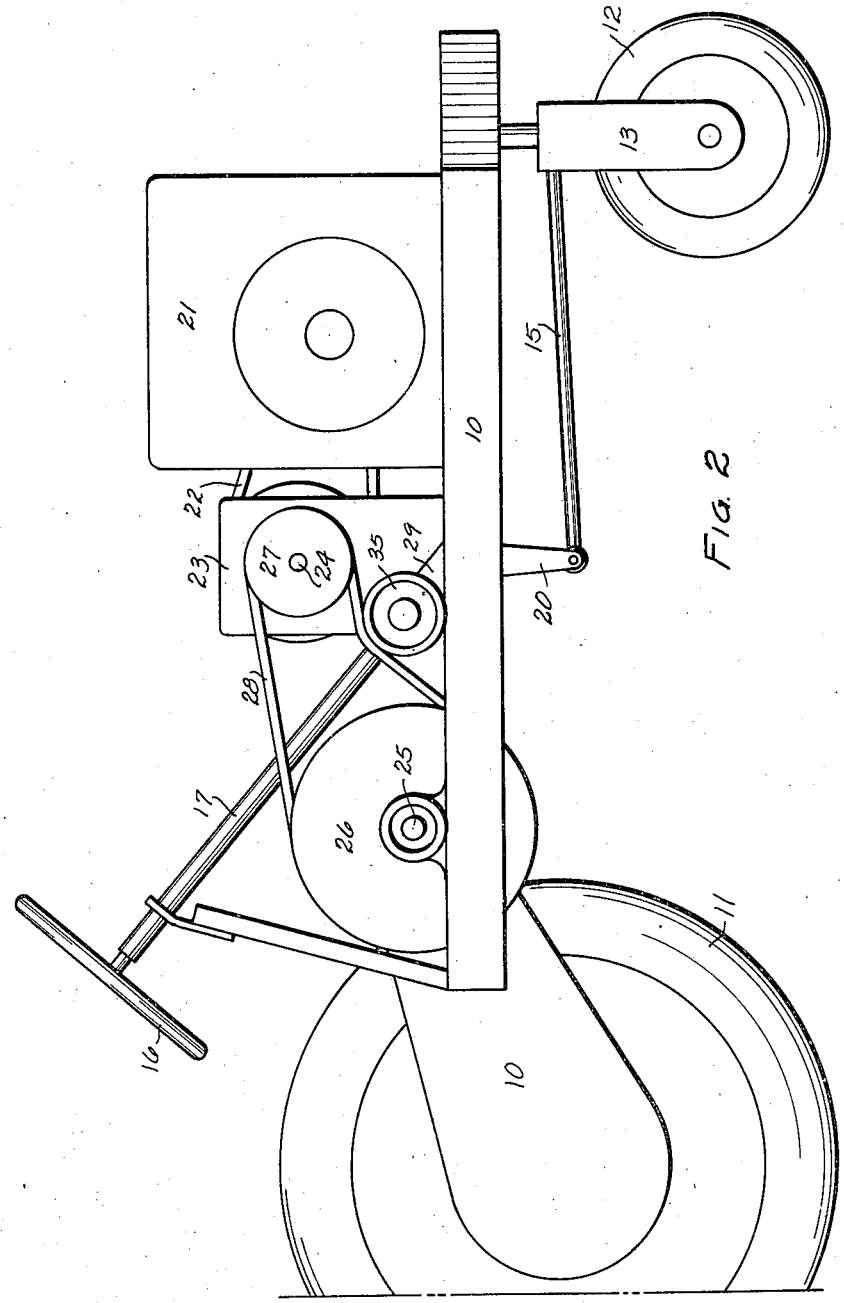

Figure 1 is a largely diagrammatic, plan view of a typical self-propelled vehicle of tractor style equipped with my improvements. Figure 2 is a vertical section taken substantially on the indicated line 2—2 of Figure 1. Figure 3 is a fragmentary, detail elevation, on an enlarged scale, of the improvements constituting the instant invention as associated with the illustrated vehicle at the zone of the indicated line 3—3 of Figure 1. Figure 4 is a front end elevation of the showing of Figure 3. Figure 5 is a cross section, on a further enlarged scale, taken on the indicated line 5—5 of Figure 4. Figure 6 is a fragmentary, detail section taken on the indicated line 6—6 of Figure 5. Figure 7 is a diagram illustrating the relation of duplicate cam elements employed in the improvement, broken lines denoting alternative extreme operative positions of said elements.

In the drawings, a three-wheel, front-wheel-steerable, self-propelled tractor unit of established type is illustrated as comprising a rearwardly-furcated, rigid frame 10 supported at its rear end by independently-driven, spacedly-parallel wheels 11 and at its front end by a single, steerable wheel 12 adjustable about its vertical mounting axis. The wheel 12 is shown as engaged for rotation about a horizontal shaft traversing the downwardly-opening end of a yoke 13 whereof an upward stem extension is journaled for rotation in the forward end of the frame 10, and an arm 14 fixedly projecting laterally from the yoke 13 upper portion pivotally connects at its outer end with the forward end of a drag link 15 disposed longitudinally of and beneath the said frame. Conventional worm-type steering mechanism not specifically illustrated, is represented in the illustrative disclosure in operative association with the related elements of the organization by the steering wheel 16, column 17, housing 18 operatively enclosing the meshed worm and gear elements of the mechanism, rock-shaft 19 journaled through the housing 18 transversely of the frame 10 and projecting at each end beyond said housing, and radial arm 20 fixed to one end of said shaft 19 to swing in a depending arc longitudinally of the tractor as the said shaft is oscillated and hingedly connecting at its end remote from said shaft with the rearward end of the link 15. As is customary practice, the steering mechanism is so constituted as to reflect rotation of the wheel 16 as a proportional oscillation of the rock-shaft 19 in a direction effective through the linkage to the steerable ground wheel to direct unit travel to the right or left, conformable to the direction of wheel 16 manipulation. Thus, in the organization shown, counterclockwise displacement of the wheel 16 by an operator facing forwardly of the tractor unit is productive of rock-shaft 19 oscillation in a direction to swing the depending radial arm 20 rearwardly of the assembly and thereby shift the link 15 rearwardly with corresponding pivoting of the yoke 13 and wheel 12 in a direction to guide the unit to the left during forward travel; clockwise displacement of said wheel 16 similarly operating to steer the unit to the right.

A source of power, such as an internal combustion engine 21, is carried by the forward portion of the frame 10 and operatively drives, in this instance through a double belt arrangement 22 effectively manipulatable for clutching purposes, the power input element of a conventional change-speed gear set 23 whereof the power output element is a shaft 24 journaled for rotation about its axis and extending transversely of the frame 10 rearwardly of the power unit 21. The shaft 24 spacedly parallels the rotational axis of the drive wheels 11 and is arranged in the manner hereinafter described to transmit power to and for either simultaneous or independent rotation of, said wheels. Rearwardly of and paralleling the shaft 24, a pair of similar, independent shaft elements 25 is journaled in axial alignment and spaced relation of their adjacent inner ends for rotation in hollow members of the frame 10, and each of said shafts 25 has its outer end operatively connected, preferably through hollow members of the frame furcated end and in any desired specific manner, in continuously-established, driving relation with the wheel 11 adjacent thereto. Thus, power rotation of one of the shafts 25 will result in rotative actuation of the wheel 11 thereto connected, and simultaneous rotation of both said shafts will effect simultaneous rotation of both wheels 11. At their inner ends, the shafts 25 are identically equipped with like, double, belt pulley sets 26 fixed thereto in spaced parallelism and in coplanar relation, longitudinally of the frame 10, with identical, double, belt pulley sets 27 on and fixed in spaced parallelism to the gear set power output shaft 24, so that belt sets 28 about and engaging between each pulley set 26 and coplanar pulley set 27 may function to transmit power delivered by the shaft 24 to and for the rotational actuation of the wheels 11. The belt sets 28 are designed to function as selectively-actuable clutches for control of power delivery alternatively or simultaneously to the wheels 11, for which purpose said belt sets are slightly longer than is effective for power transmission, thereby providing in each belt set a slack bight wherein the associated pulley set 27 may rotationally slip without driving effect on the associated pulley set 26, and driving effect between coplanar pulley sets 26 and 27 is established, when desired, by tightening the associated belt set 28 about said pulleys through the agency of a shiftable idler wheel in bearing engagement against the outer side of the belt set between said pulleys; one such idler wheel selectively shiftable independently of the other being provided for each belt set 28 to the end that full clutch control for either independent or simultaneous driving of the independent shafts 25 may be had.

All of the foregoing is established construction and practice which, in and of itself, forms no part of the instant invention, but it is necessarily described at some length to facilitate understanding of the locus wherein and of the elements wherewith the improvements of the invention are designed to function.

The invention is directed to the provision, in a tractor unit of the type shown and described, of means responsive to manipulation of the steering mechanism for automatic control of the clutch effect inherent in the arrangement of the belt sets 28, thereby to enhance the operative flexibility and maneuverability of the unit by engagement of both belt sets 28 in full driving relation with their associated wheels 11 when the unit is steered for straight-line travel and by interruption of the belt set drive to the wheel 11 on the inward side of a turn when the unit is steered to any deviation from straight-line travel.

To effect the ends desired, the rock-shaft 19 of the steering mechanism, disposed transversely of the frame 10, is extended in journaled relation through spaced brackets 29 fixed to and upstanding from said frame spacedly adjacent corresponding sides of the belt sets 28 lower runs, said rock-shaft 19 extension traversing both brackets 29. Each bracket 29 is intersected adjacent the rock-shaft 19 by a slot 30 elongated radially of said shaft and directed upwardly and rearwardly of the unit therefrom, and a somewhat longer slot 31 intersects the upper portion of each bracket in end-spaced, longitudinal alignment with the associated slot 30. A slide plate 32 bridges between and overlies the major lengths of the slots 30 and 31 in each bracket 29 and bears against the side of its bracket remote from the associated belt set 28, a headed stud 33 being formed with a shank for slidable accommodation within the slot 30 and engaging through said slot and with the lower end of the slide plate 32 to guide and position the latter relative to its bracket 29, while a functionally similar stud 34 is adjustably clamped at one end in a slot longitudinally of the slide plate and slidably engages within the bracket slot 31 to guide and position the said slide plate upper end relative to the bracket. The end of the stud 34 is extended perpendicularly to the slide plate 32 on the side of the bracket 29 remote from said slide plate to provide a bearing whereon an idler wheel 35 is mounted for free rotation directly beneath and in position to bear at times against the outer surface of the lower run of the belt set 28 adjacent the bracket, one such idler wheel 35 being so provided for each of the belt sets 28, and the end of the stud 33 is extended away from the bracket 29 through the slide plate 32 to provide a mounting and bearing for a rotatable cam follower 36 freely revoluble thereabout on the side of said slide plate remote from the bracket and in spaced, axially-parallel, overhanging relation with the rock-shaft 19 extension.

In the arrangement of elements shown and described, the slide plate 32 is slidably held to the bracket 29 for diagonal reciprocation relative to said bracket toward and away from the associated belt set 28 lower run, the mounting being such as to normally gravity-urge the shiftable assembly to the lower limit of its travel range, and the adjustment provided for the stud 34, bearing the idler wheel 35, longitudinally of the slide plate 32 permits positioning of said idler wheel for non-tightening relation with the associated belt set 28 when the shiftable assembly is at the lower limit of its travel range and for tightening engagement against said belt set lower run when the said assembly approaches its upper travel range limit, the shiftable assembly hence functioning, in each instance, as clutch-actuating means for control of driving effect had through the associated belt set. The rock-shaft 19, being responsive to manipulation of the steering wheel 16, is utilized for the automatic shifting of the slide assemblies to bring their respective idler wheels 35 into drive-effecting engagement with the associated belt sets 28, to which end like cams 37 are fixed in spaced relation to, radially of, and for rotation with said rock-shaft, one such cam being disposed in coplanar relation with, beneath, and for rolling engagement against the periphery of each of the cam followers 36. Each cam 37 is a plate-like element having an extreme end margin arcuately concentric with the rock-shaft 19 and at a distance radially outward from said shaft such as will, when in bearing engagement against the periphery of its follower 36, move the slide assembly to drive-effecting engagement of the associated idler wheel 35 against the belt set 28, the circumferential extent of said cam extreme margin being on the order of sixty-three degrees of rotation. The said cams 37 are fixed to the rock-shaft 19 in relative angular displacement such as will bring the forward, or leading corner of one cam into approximate alignment axially of the rock-shaft with the rearward, or trailing, corner of the other cam, and so that the trailing corner of the left-hand cam and the leading corner of the right-hand cam simultaneously engage with their respective followers for simultaneous drive-effecting elevation of their slide assemblies when the rock-shaft is positioned for straight-line travel of the unit. With the cams 37 so positioned, manipulation of the steering wheel 16 for a left-hand turn acts through the rock-shaft 19 to rotate the left-hand cam out of bearing relation of its extreme margin against its follower 36, thus permitting the associated slide assembly to retract toward the shaft 19 with consequent interruption of the drive to the wheel 11 on the inside of the turn, while the arcuate extent of the other cam margin is sufficient to maintain said cam in elevating relation with its slide assembly for preservation of drive to the wheel 11 on the outside of the turn and consequent power aid in effectuating such turn. Obviously, manipulation of the steering wheel 16 for a right-hand turn reverses the relative position and action of the cams 37, to the end that drive to the wheel 11 on the inside of the turn is interrupted while drive is maintained to the wheel 11 on the outside of the turn.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. Drive-correlating steering means for tractors having spacedly-parallel, like drive members supporting one end of the tractor, steerable supporting means at the other end of the tractor, independent power trains to said drive members, a normally-loose, consequently-inoperative, belt drive section in each of said power trains, steering mechanism manually actuatable for the directional control of said steering means, and means selectively shiftable in automatic reaction to steering mechanism manipulation into tightening, drive-completing relation with each said belt drive section, wherein the selectively-shiftable, tightening means associated with each power train belt drive section includes a plate bracket slide-mounted adjacently below the associated belt drive section lower run for selective elevation toward said lower run and gravity-urged retraction away from said run, an idler wheel carried for free rotation on the upper end of said plate and shiftable into and out of belt-tightening relation against the belt drive section lower run with said plate, and a freely-rotatable actuating follower on, and for shift-inducing travel with, the lower end of said plate.

2. Drive-correlating steering means for tractors having spacedly-parallel, like drive members supporting one end of the tractor, steerable supporting means at the other end of the tractor, independent power trains to said drive members, a normally-loose, consequently-inoperative, belt drive section in each of said power trains, steering mechanism manually actuatable for the directional control of said steering means, and means selectively shiftable in automatic reaction to steering mechanism manipulation into tightening, drive-completing relation with each said belt drive section, wherein the selectively-shiftable, tightening means associated with each power train belt drive section consists of an idler-wheel-equipped, gravity-responsive assembly slide-mounted adjacently below and for elevation into tightening engagement against the belt drive section lower run, and an actuating follower freely rotatable in a vertical plane on, and for shift-inducing travel with, the assembly lower end, the element reactive to steering mechanism manipulation being a rock-shaft perpendicular to and horizontally beneath both belt drive sections adjacently below the shiftable assembly lower ends, and the connections between said element and the selectively-shiftable, tightening means consist of like, arcuate-ended cams fixedly projecting in axially-spaced, angularly-offset relation radially from said rock-shaft for end engagement in elevating relation with said assembly actuating followers as an incident of rock-shaft oscillation.

3. In a tractor having spacedly-parallel, like drive members supporting one of its ends and steerable supporting means at its other end, independent power trains to said drive members, a normally-loose, consequently-inoperative, belt drive section in each of said power trains, and steering mechanism manually actuatable for the directional control of said steerable means, means reactive to steering mechanism manipulation to effect drive simultaneously through both of said belt drive sections during straight-line tractor travel and to interrupt drive through the section serving the radially-inward drive member during curvilinear tractor travel, said means comprising a horizontal rock-shaft element extension from the steering mechanism perpendicular to and beneath both said belt drive sections, a plate bracket-mounted for slidable, vertical adjustment between said shaft and the lower run of each belt drive section, an idler wheel freely rotatable on and for travel with the upper end of each said plate into and out of tightening engagement with the associated belt lower run, an actuating follower freely rotatable in a vertical plane on and for travel with each plate lower end, and an arcuate-ended cam fixed to and projecting radially from said rock-shaft extension for plate-elevating engagement with each of said followers as an incident of rock-shaft oscillation.

4. The organization as set forth in claim 3, wherein said cams are fixed to said rock-shaft in axially-spaced, angularly-offset relation such as to dispose a leading edge corner of one cam in substantially the same plane radially of the shaft as the trailing edge corner of the other cam for simultaneous plate-elevating engagement with their respective followers in the straight-line tractor travel position of said rock-shaft.

LAWRENCE K. SPITZER.

REFERENCES CITED

The following references are of record in the file of this patent:

UNITED STATES PATENTS

| Number | Name | Date |
|---|---|---|
| 1,589,393 | Howe | June 22, 1926 |

FOREIGN PATENTS

| Number | Country | Date |
|---|---|---|
| 22,738 | Great Britain | Oct. 9, 1897 |